Figure 1:
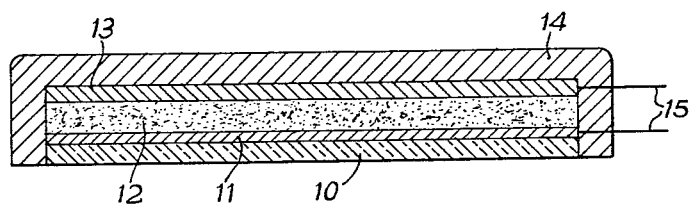

Sept. 4, 1962  D. H. MASH  3,052,810
ELECTRO-LUMINESCENT LAMPS
Filed Feb. 18, 1958

INVENTOR
DEREK HUBERT MASH

BY
ATTORNEY 3,052,810
ELECTRO-LUMINESCENT LAMPS
Derek Hubert Mash, London, England, assignor to Thorn
 Electrical Industries Limited, London, England
Filed Feb. 18, 1958, Ser. No. 715,874
Claims priority, application Great Britain Feb. 18, 1957
2 Claims. (Cl. 313—108)

This invention relates to electro-luminescent lamps, that is to luminous capacitors in which the dielectric medium includes or consists of a phosphor or phosphors directly excited to emit light by the application of an electric field.

Thus an electroluminescent lamp is usually made in the form of a panel comprising for instance, a sheet of glass or suitable plastic coated on one side with a transparent conducting film, such as a thin film of metal, forming one electrode of the lamp. A coating of an electroluminescent material is applied over the electrode and covered with a second electrode which may be opaque. On application of a suitable exciting field between the electrodes the panel emits light through the sheet of glass or plastic.

A number of materials are known to exhibit electroluminescence, including for example, silicon carbide and zinc silicate, but in commercial lamps phosphors which are mixtures of zinc sulphide with various activators are most commonly used, because of their relatively high efficiency. By varying the amount and nature of the activators, phosphors which emit various colours can be made. Zinc sulphides with copper and sometimes chlorine, manganese or lead as activators are readily prepared to emit green, blue or yellow light. Mixtures of these colours, which approximate to white, can be produced from a mixture of phosphors, but the colour of the light emitted by such mixtures is dependent on the strength and frequency of the exciting field because of the unequal characteristics of the phosphors. Furthermore at present there is no suitable phosphor emitting red light.

According to the present invention there is provided an electroluminescent lamp wherein there is mixed with or disposed in contact with the electroluminescent phosphor or phosphors of the lamp, a fluorescent material adapted to absorb at least part of the light emitted by the phosphor and adapted to be excited thereby to emit light at a wavelength longer than that of the absorbed light. Whilst fluorescent material in contact with the phosphor, for instance incorporated in a reflecting layer, will have a useful effect, greater efficiency is obtained by mixing the fluorescent material with the phosphor.

The invention enables an electroluminescent lamp emitting a substantial proportion of red light to be provided by using a mixture of an electroluminescent phosphor emitting light of one wavelength with a fluorescent substance or a mixture of such substances, which absorbs light of this wavelength and emits red light. If necessary a red filter may be used to absorb components of the light other than the red component in order to obtain red light. Alternatively a red dye may be incorporated in the electroluminescent material to absorb components of the light other than red light.

The invention also enables an electroluminescent lamp emitting substantially white light to be provided, using a mixture of suitable fluorescent materials with one electroluminescent phosphor. Since only one electroluminescent phosphor is used the colour of the light emitted is independent of the strength of the exciting electric field.

Some fluorescent substances which may be used in carrying the invention into effect are:

The organic dye rhodamine which, in a solid or liquid solution of the right concentration, absorbs green light and emits red light; the organic dye fluorescein which absorbs blue light and emits green light; certain inorganic phosphors; the range of substance consisting of powdered solid solutions of certain dyes and commercially available as "Day-Glo" materials.

Figure 2:
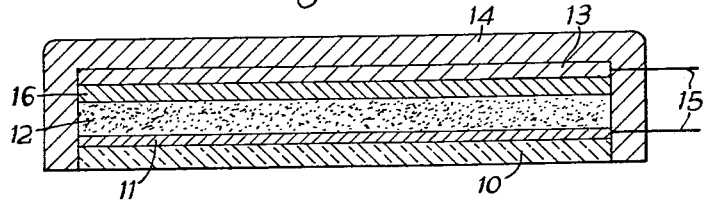

The invention will now be described, by way of example, with reference to the accompanying drawings, in which:

FIGURE 1 is a diagrammatic section of an electroluminescent lamp according to the invention, and FIGURE 2 is a diagrammatic section of another electroluminescent lamp according to the invention.

In FIGURE 1 the electroluminescent lamp comprises a transparent support 10 of glass. A thin transparent electrode 11 of stannic chloride is deposited on the support 10 and a light-producing layer 12 to be described hereinafter is deposited on the support 10. Glass with an electrode of stannic chloride or other such substances is usually referred to as conducting glass. Another electrode 13 is deposited on the layer 12 and the layers 11, 12 and 13 are protected by a coating 14 of a sealing material impervious to air and moisture. The electrode 13 may be a layer of a metal such as aluminium provided by vacuum deposition. Wires 15 are connected to the electrodes 11 and 13 for enabling an exciting potential to be applied between the two electrodes.

The light-producing layer 12 is composed of a mixture of zinc sulphide, activated in known manner to emit green light, and rhodamine in a di-electric medium. The proportions are such that the lamp emits purple light. The blue component of the purple light can be removed by a red filter. Alternatively the blue component may be removed by a non-fluorescent, oil-soluble red dye included in the said mixture. The rhodamine may be replaced by the material commercially available as "Day-Glo Fire-Orange."

Alternatively the proportions of the said mixture may be made such that the emitted light is substantially white, that is it contains red, blue and green components in approximately correct proportions. This is achieved by lessening the proportion of rhodamine or "Fire-Orange," whereby a substantial proportion of the green light emitted by the zinc sulphide is not absorbed.

The lamp shown in FIGURE 2 is similar to that shown in FIGURE 1. However, a reflecting layer 16 is provided between the light producing layer 12 and the electrode 16. The reflecting layer 16 is composed of a mixture of barium titanate and rhodamine dispersed in a di-electric medium. The light-producing layer 12 may be zinc sulphide alone, in which case a proportion of the light which it emits is absorbed and re-emitted by the layer 16 as red light. Alternatively the layer 12 may be a mixture of zinc sulphide and rhodamine whereby a larger proportion of the light given out by the lamp is red.

I claim:

1. An electroluminescent lamp comprising, in the order named, a transparent electrode, a light-producing layer, a reflecting layer and a second electrode, said reflecting layer comprising a fluorescent material absorbing at least part of the light emitted by said phosphor and being excited by the absorbed light to emit light at a wavelength longer than that of the absorbed light.

2. An electroluminescent lamp comprising, in the order named, a transparent electrode, a light-producing layer and a second electrode, said light-producing layer comprising a mixture of an electroluminescent phosphor, a fluorescent material and a non-fluorescent dye, such fluorescent material absorbing at least part of the light emitted by said phosphor and being excited by the absorbed light to emit light at a wavelength longer than that of the absorbed light and said dye absorbing light of a colour other than that emitted by said fluorescent material.

References Cited in the file of this patent

UNITED STATES PATENTS

| | | |
|---|---|---|
| 2,314,096 | Leverenz | Mar. 16, 1943 |
| 2,452,518 | Burns | Oct. 26, 1948 |
| 2,624,857 | Mager | Jan. 6, 1953 |
| 2,780,731 | Miller | Feb. 5, 1957 |

OTHER REFERENCES

Larach: RCA TN No. 10, August 9, 1957.